US010364151B2

(12) United States Patent
Wynn et al.

(10) Patent No.: US 10,364,151 B2
(45) Date of Patent: Jul. 30, 2019

(54) HYDROGEN PEROXIDE CATALYST (71) Applicant: Airbus Defence and Space Limited, Stevenage (GB)

(72) Inventors: Jonathan Thomas William Wynn, Stevenage (GB); Anthony Joseph Musker, Stevenage (GB)

(73) Assignee: Airbus Defence and Space Limited, Stevenage (GB)

( * ) Notice: Subject to any disclaimer, the term of this patent is extended or adjusted under 35 U.S.C. 154(b) by 316 days.

(21) Appl. No.: 14/917,562

(22) PCT Filed: Sep. 8, 2014

(86) PCT No.: PCT/GB2014/052710
§ 371 (c)(1),
(2) Date: Apr. 15, 2016

(87) PCT Pub. No.: WO2015/033165
PCT Pub. Date: Mar. 12, 2015

(65) Prior Publication Data
US 2016/0229694 A1 Aug. 11, 2016

(30) Foreign Application Priority Data

Sep. 9, 2013 (EP) .................................... 13275203

(51) Int. Cl.
*C06B 47/00* (2006.01)
*C01B 13/02* (2006.01)
(Continued)

(52) U.S. Cl.
CPC ............. *C01B 13/0214* (2013.01); *B01J 7/00* (2013.01); *B01J 21/04* (2013.01); *B01J 23/42* (2013.01);
(Continued)

(58) Field of Classification Search
USPC ............................................................ 149/1
See application file for complete search history.

(56) References Cited

U.S. PATENT DOCUMENTS 6,806,390 B1 * 10/2004 Herron .................... B01J 23/52
568/342
2004/0197247 A1 10/2004 Lohner et al.
(Continued)

FOREIGN PATENT DOCUMENTS

RU 2099565 C1 12/1997
RU 2328616 C1 7/2008
WO 2007015070 A1 2/2007

OTHER PUBLICATIONS

International Search Report and Written Opinion for PCT/GB2014/052710 dated Nov. 11, 2014.
(Continued)

*Primary Examiner* — James E McDonough
(74) *Attorney, Agent, or Firm* — Chang & Hale LLP (57) ABSTRACT A catalyst for decomposing high-concentration hydrogen peroxide comprises an active layer on a carrier comprising gamma-phase alumina. The carrier can also comprise aluminum, with the gamma-phase alumina forming a passivating layer on the surface of the aluminum. The active layer can comprise platinum. Apparatus for decomposing hydrogen peroxide can include the catalyst in a decomposition chamber arranged to receive hydrogen peroxide. The apparatus can be used as a thruster, comprising a nozzle arranged to generate thrust by directing exhaust gases in a specific direction. For example, the thruster can be a monopropellant, bipropellant, or hybrid thruster. In other embodiments, the apparatus can be used as a gas generator or a fuel cell.

9 Claims, 7 Drawing Sheets (51) Int. Cl.
  *B01J 7/00* (2006.01)
  *C06D 5/04* (2006.01)
  *C01B 3/04* (2006.01)
  *B01J 21/04* (2006.01)
  *B01J 23/42* (2006.01)
  *F02K 9/08* (2006.01)
  *F02K 9/42* (2006.01)
  *H01M 4/90* (2006.01)
  *D03D 23/00* (2006.01)
  *D03D 43/00* (2006.01)
  *B64G 1/40* (2006.01)
  *H01M 4/86* (2006.01)

(52) U.S. Cl.
  CPC .............. *C01B 3/04* (2013.01); *C06D 5/04* (2013.01); *F02K 9/08* (2013.01); *F02K 9/425* (2013.01); *H01M 4/9075* (2013.01); *B64G 1/401* (2013.01); *B64G 1/404* (2013.01); *H01M 2004/8684* (2013.01); *Y02E 60/364* (2013.01)

(56) References Cited

U.S. PATENT DOCUMENTS

| | | | |
|---|---|---|---|
| 2004/0197252 A1 | 10/2004 | Parrish | |
| 2004/0216818 A1 | 11/2004 | Lundstrom et al. | |
| 2007/0169461 A1* | 7/2007 | Koerner | C06B 47/02 60/39.12 |
| 2011/0167793 A1* | 7/2011 | Kwon | F02K 9/26 60/251 |
| 2012/0034541 A1* | 2/2012 | Muraoka | H01M 8/0215 429/456 |
| 2012/0308905 A1* | 12/2012 | Kawahara | H01M 8/04223 429/414 |

OTHER PUBLICATIONS

Office Action dated May 21, 2018, for Related Russian Application No. 125709.

* cited by examiner

HYDROGEN PEROXIDE CATALYST

TECHNICAL FIELD

The present invention relates to catalysing the decomposition of hydrogen peroxide. More particularly, but not exclusively, the present invention relates to catalysing the decomposition of hydrogen peroxide in a thruster.

BACKGROUND OF THE INVENTION

Monopropellant rocket engines, commonly referred to as thrusters, generate thrust by using a catalyst to energetically instigate the reaction of a propellant into hot gases. The most commonly used monopropellant, hydrazine ($N_2H_4$), is toxic and must be handled in closed containers. To overcome these problems, low-toxicity propellants have been developed as alternatives to hydrazine. These low-toxicity propellants are commonly referred to as 'green' propellants. One of the most popular green propellants is hydrogen peroxide ($H_2O_2$), which decomposes exothermically in the presence of a suitable catalyst, generating water vapour and oxygen.

In general, it is desirable to use higher concentrations of hydrogen peroxide in monopropellant thrusters, as higher concentrations result in higher temperatures during decomposition. The hot gases are expelled through a nozzle to produce thrust in a specific direction, with higher gas temperatures resulting in more thrust being generated. Conventional hydrogen peroxide monopropellant thrusters utilise a silver catalyst to decompose the hydrogen peroxide. However, silver-based catalysts rapidly deteriorate at high temperatures, making the conventional catalysts unsuitable for prolonged use at high concentrations of $H_2O_2$ (>80%). There is therefore a need for a more robust hydrogen peroxide catalyst.

The invention is made in this context.

SUMMARY OF THE INVENTION

According to the present invention, there is provided apparatus comprising: a decomposition chamber comprising an inlet arranged to receive high-concentration hydrogen peroxide; and a catalyst disposed in the decomposition chamber to catalyse decomposition of the high-concentration hydrogen peroxide received through the inlet, the catalyst comprising an active layer on a carrier comprising gamma-phase alumina.

By 'high-concentration', it is meant that the hydrogen peroxide has a concentration greater than 70%.

The carrier can further comprise aluminium and the gamma-phase alumina can be disposed on the surface of the aluminium as a passivation layer.

The active layer can comprise platinum.

The apparatus can further comprise a reservoir storing hydrogen peroxide with a concentration of up to and including 100%, the reservoir being arranged to provide the hydrogen peroxide to the inlet.

The catalyst can be in pellet, granule or monolithic form. However, embodiments of the invention are not limited to these physical forms, and in other embodiments the catalyst can be in any other form comprising the active and passive components, namely the active layer and the passive alumina-based carrier.

The apparatus can be a thruster and can further comprise a nozzle in fluid communication with the decomposition chamber, the nozzle being arranged to provide thrust by directing gas produced during decomposition of the hydrogen peroxide. For example, the thruster can be a monopropellant thruster.

The apparatus can be a bipropellant thruster, and the decomposition chamber can further comprise a fuel inlet arranged to receive fuel from a fuel tank, the fuel inlet being disposed such that the fuel combusts with oxygen produced by the decomposition of the hydrogen peroxide.

The apparatus can be a hybrid thruster and can further comprise a solid fuel arranged to combust with oxygen produced by the decomposition of the hydrogen peroxide.

The apparatus can further comprise means for separating water vapour and oxygen produced by the decomposition of the hydrogen peroxide.

The apparatus can be a fuel cell and can further comprise: an anode comprising the catalyst; a cathode arranged to be electrically connected to the anode via a load; and an electrolyte separating the anode from the cathode, the electrolyte being arranged to permit movement of hydrogen ions from the anode to the cathode.

The apparatus can be included in a spacecraft.

According to the present invention, there is also provided a method of generating thrust, the method comprising: using a catalyst comprising an active layer on a carrier comprising gamma-phase alumina to catalyse the decomposition of hydrogen peroxide to produce exhaust gases; and directing the exhaust gases through a nozzle to generate thrust.

The method can further comprise combusting a fuel with oxygen produced from the decomposition of the hydrogen peroxide, to produce the exhaust gases.

The hydrogen peroxide can have a concentration of up to and including 100%.

According to the present invention, there is further provided the use of a catalyst comprising an active layer on a carrier comprising gamma-phase alumina, to catalyse the decomposition of hydrogen peroxide.

BRIEF DESCRIPTION OF THE DRAWINGS

Embodiments of the present invention will now be described, by way of example only, with reference to the accompanying drawings, in which.

DETAILED DESCRIPTION

Figure 1:
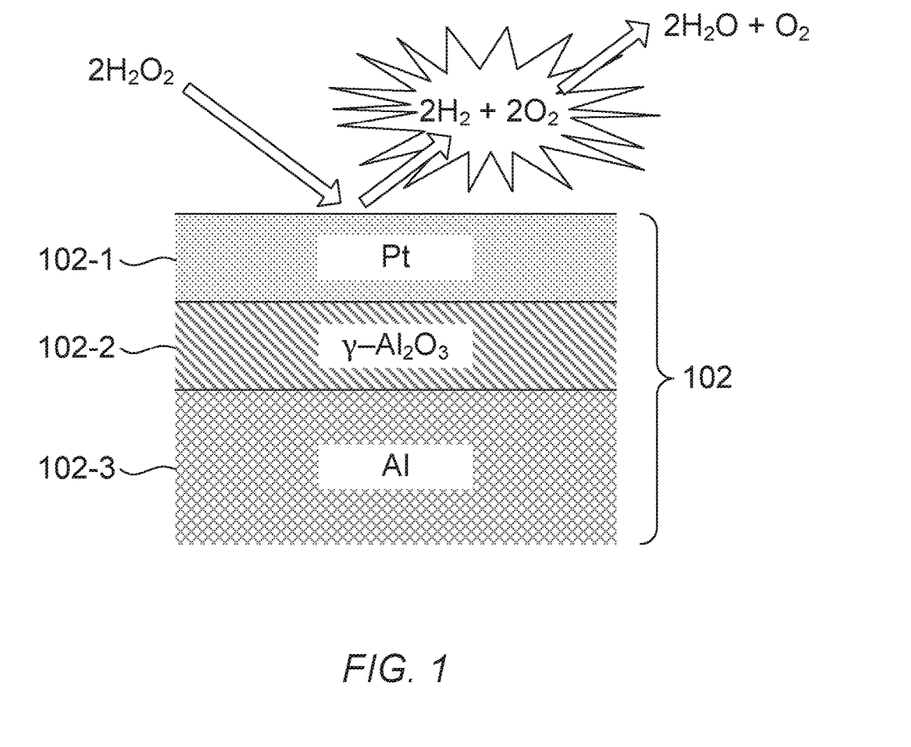
FIG. 1 illustrates a catalyst for decomposing hydrogen peroxide, according to an embodiment of the present invention.

A catalyst for decomposing hydrogen peroxide is illustrated in FIG. 1. The catalyst 102 comprises a platinum active layer 102-1 on the surface of a carrier comprising gamma ($\gamma$) phase alumina ($Al_2O_3$) 102-2. In the present embodiment the carrier further comprises an aluminium base 102-3, with the $\gamma$-$Al_2O_3$ 102-2 disposed as a surface layer on the Al base 102-3. The γ-Al$_2$O$_3$ 102-2 acts as a passivation layer on the Al base 102-3, protecting the Al base 102-3 from further oxidation during decomposition of the H$_2$O$_2$.

As shown in FIG. 1, the catalyst 102 causes the H$_2$O$_2$ to decompose, producing gaseous hydrogen and oxygen. Since the decomposition is highly exothermic, the hydrogen gas then combusts in the presence of the oxygen, forming water vapour. The overall decomposition reaction can therefore be summarised as:

In other embodiments the Al base 102-3 can be omitted from the carrier. For example, in another embodiment the catalyst can comprise a Pt active layer on bulk Al$_2$O$_3$. Also, although platinum is used for the active layer 102-1 in the present embodiment, in other embodiments the active layer can comprise a material other than platinum, for example silver or another transition metal can be used.

Investigations by the inventor have shown that the use of γ-phase alumina as a carrier for a hydrogen peroxide catalyst improves the stability of the carrier, and the catalyst as a whole, at the high temperatures occurring in the decomposition chamber during decomposition of the hydrogen peroxide.

Figure 2:
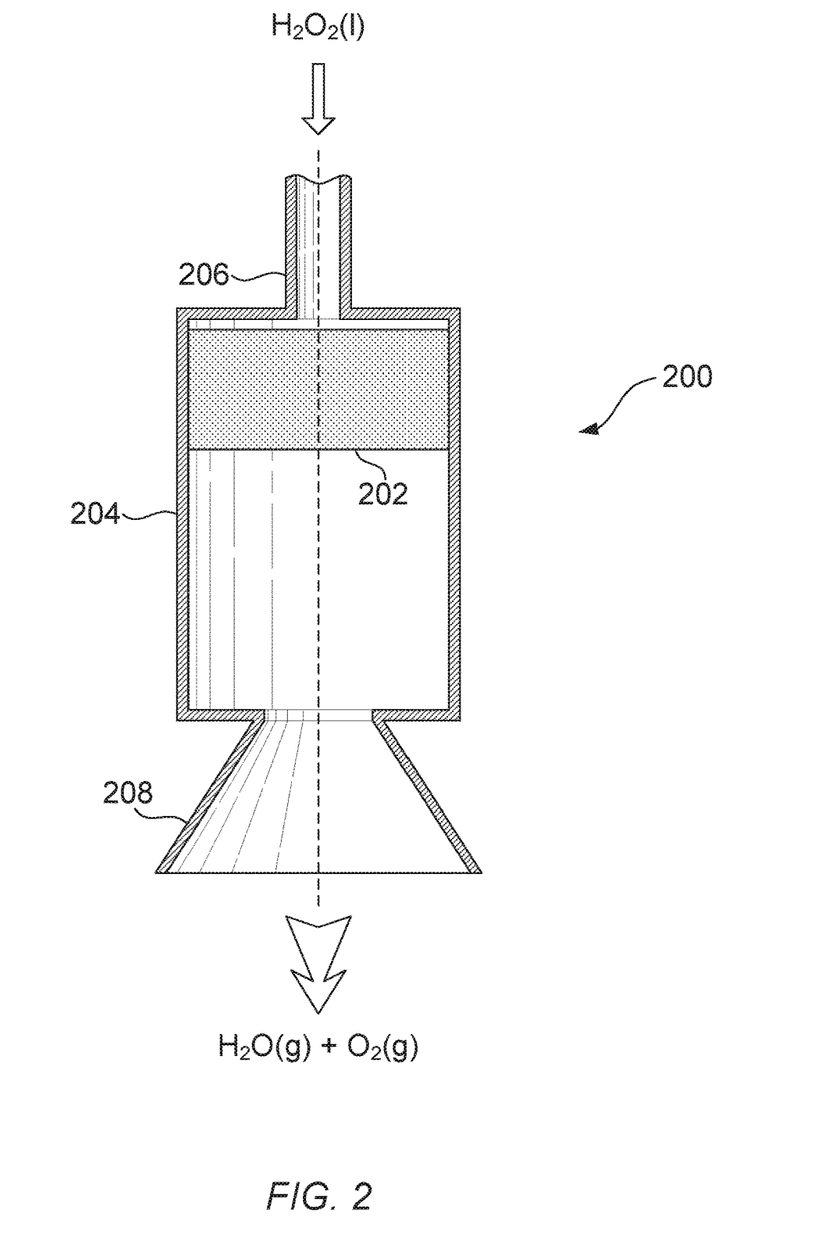
FIG. 2 illustrates a monopropellant thruster according to an embodiment of the present invention.
Figure 7:
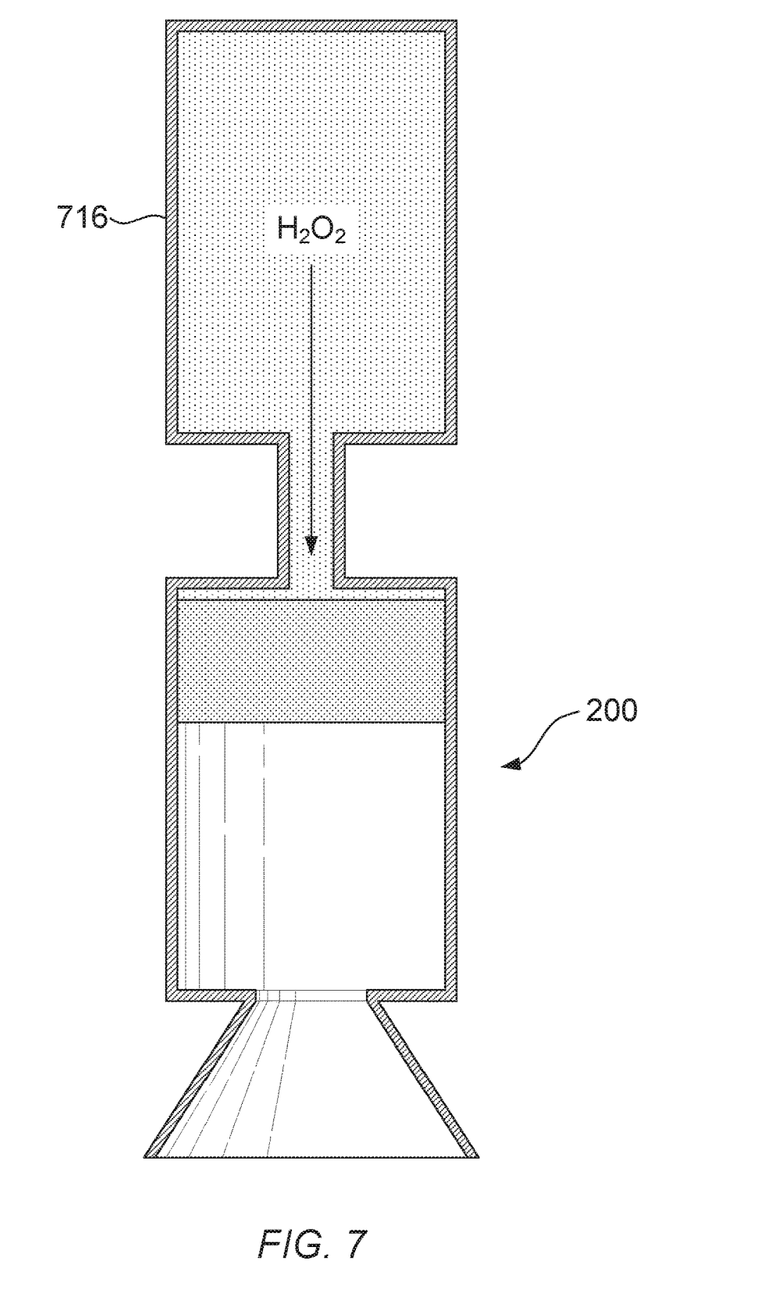
FIG. 7 illustrates the thruster of FIG. 2 connected to a hydrogen peroxide reservoir, according to an embodiment of the present invention.

Referring now to FIGS. 2 and 7, an apparatus for decomposing hydrogen peroxide is illustrated according to an embodiment of the present invention. The apparatus 200 comprises a decomposition chamber 204 including an inlet 206 arranged to receive hydrogen peroxide (H$_2$O$_2$) from a reservoir 716.

The apparatus further comprises a catalyst 202 disposed in the decomposition chamber 204 to catalyse decomposition of the hydrogen peroxide received through the inlet 206. Here, the term "decomposition chamber" refers to the container in which the decomposition of the H$_2$O$_2$ occurs. In the present embodiment the decomposition chamber 204 is formed as a hollow cylindrical body, but in other embodiments the decomposition chamber can take a different form. The catalyst is similar to the catalyst shown in FIG. 1, and includes a platinum active layer on a carrier comprising γ-Al$_2$O$_3$. The catalyst can take any physical form, including but not limited to pellet, granule or monolithic forms.

As shown in FIG. 7, the reservoir 716 is arranged to provide the hydrogen peroxide to the inlet 206. The reservoir 716 can store hydrogen peroxide with any concentration from 80% up to and including 100%, since the robust γ-Al$_2$O$_3$ carrier allows the catalyst 202 to survive for extended periods of time at the high temperatures generated during decomposition of high-concentration hydrogen peroxide. When the hydrogen peroxide concentration is less than 100%, the impurity can be water.

In the present embodiment the apparatus 200 is employed a monopropellant thruster, and further comprises a nozzle 208 in fluid communication with the decomposition chamber 204. The nozzle 208 is arranged to expel the hot H$_2$O and O$_2$ as exhaust gases in a specific direction to generate thrust. As the hydrogen peroxide is used as a propellant in this embodiment, the reservoir 716 can also be referred to as a propellant tank. However, embodiments of the invention are not limited to use in thrusters. In other embodiments the catalyst can be used for H$_2$O$_2$ decomposition in other applications.

Test results from a monopropellant hydrogen peroxide thruster such as the one shown in FIG. 2, employing a catalyst with the structure shown in FIG. 1, have shown that the thruster performance over extended burns is improved in comparison to thrusters employing conventional silver-based catalysts.

Examples of other types of apparatus employing catalysts such as the one shown in FIG. 1 will now be described, with reference to FIGS. 3 to 6.

Figure 3:
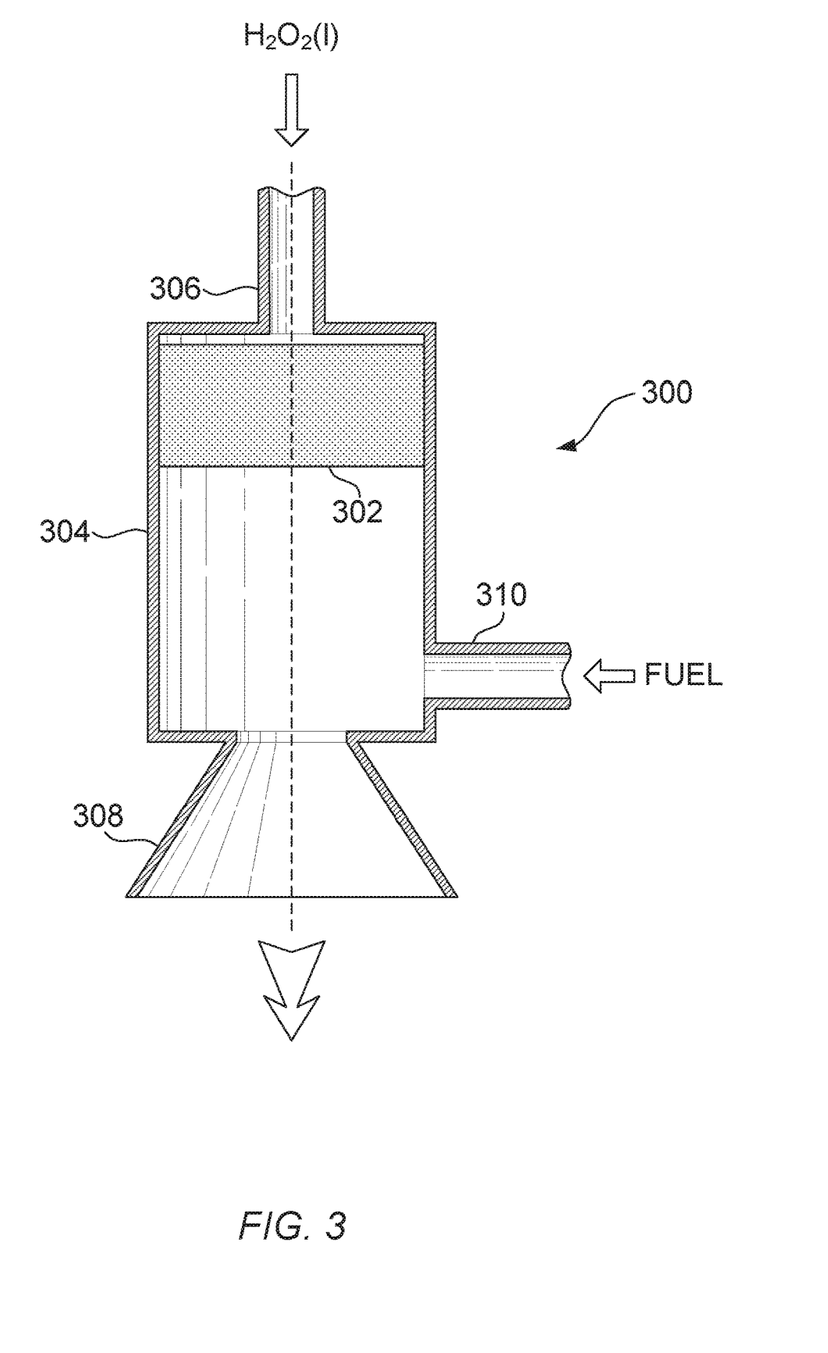
FIG. 3 illustrates a bipropellant thruster according to an embodiment of the present invention.

FIG. 3 illustrates a bipropellant thruster 300 according to an embodiment of the present invention. Similar to the monopropellant thruster 200 of FIG. 2, the bipropellant thruster 300 of the present embodiment comprises the catalyst 302 disposed in a decomposition chamber 304 which comprises an inlet 306 arranged to receive hydrogen peroxide, and a nozzle 308 in fluid communication with the decomposition chamber 304 to generate thrust by directing exhaust gases in a specific direction. The decomposition chamber further comprises a fuel inlet 310 arranged to receive fuel from a fuel tank. The fuel inlet is disposed such that the fuel combusts with oxygen produced by the decomposition of the hydrogen peroxide, producing exhaust gases which are then expelled from the nozzle 308.

Figure 4:
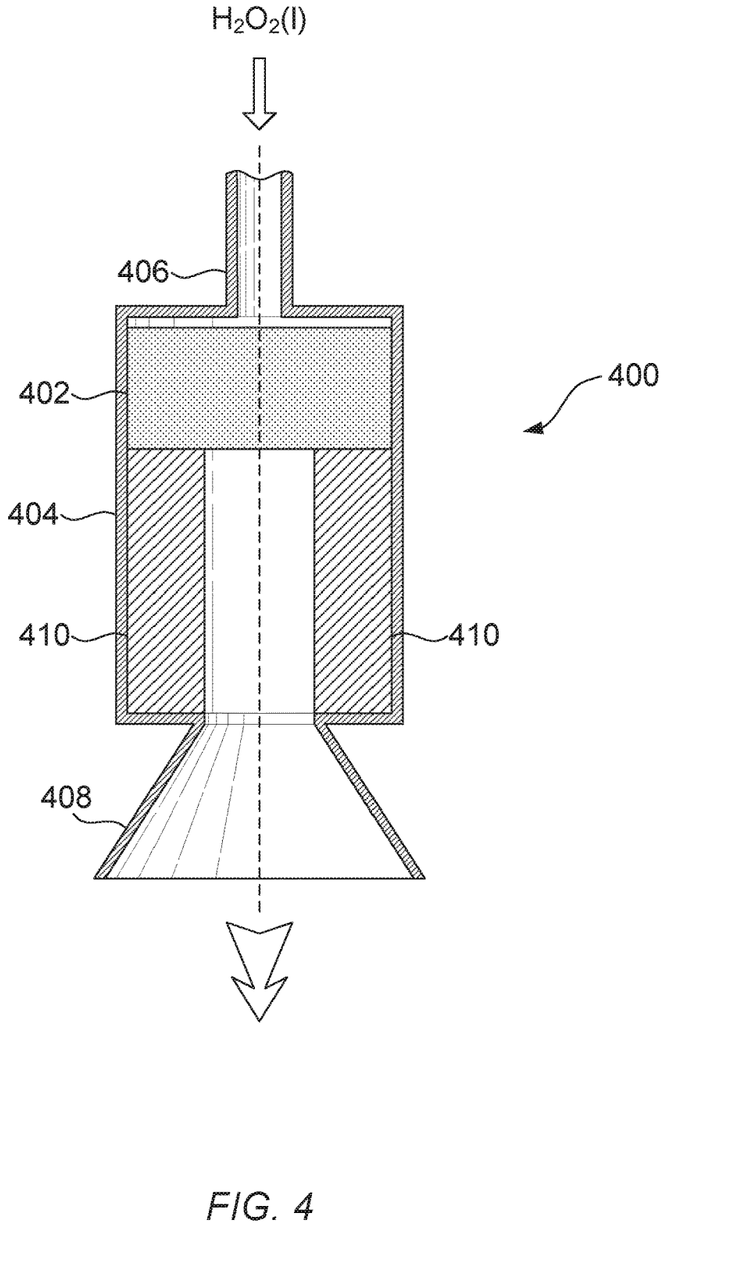
FIG. 4 illustrates a hybrid thruster according to an embodiment of the present invention.

FIG. 4 illustrates a hybrid thruster 400 according to an embodiment of the present invention. As with the embodiments of FIGS. 2, and 3, the hybrid thruster 400 of the present embodiment comprises the catalyst 402, decomposition chamber 404, inlet 406 and nozzle 408. In addition, the hybrid thruster 400 further comprises a solid fuel 410 disposed in the decomposition chamber 404. The solid fuel 410 is arranged to combust with oxygen produced by the decomposition of the hydrogen peroxide, thereby producing exhaust gases which can be expelled from the nozzle 408 to generate thrust. In the present embodiment the solid fuel 410 is formed as an annular body inside the decomposition chamber 404, but in other embodiments the solid fuel 410 could be provided in different physical forms.

Figure 5:
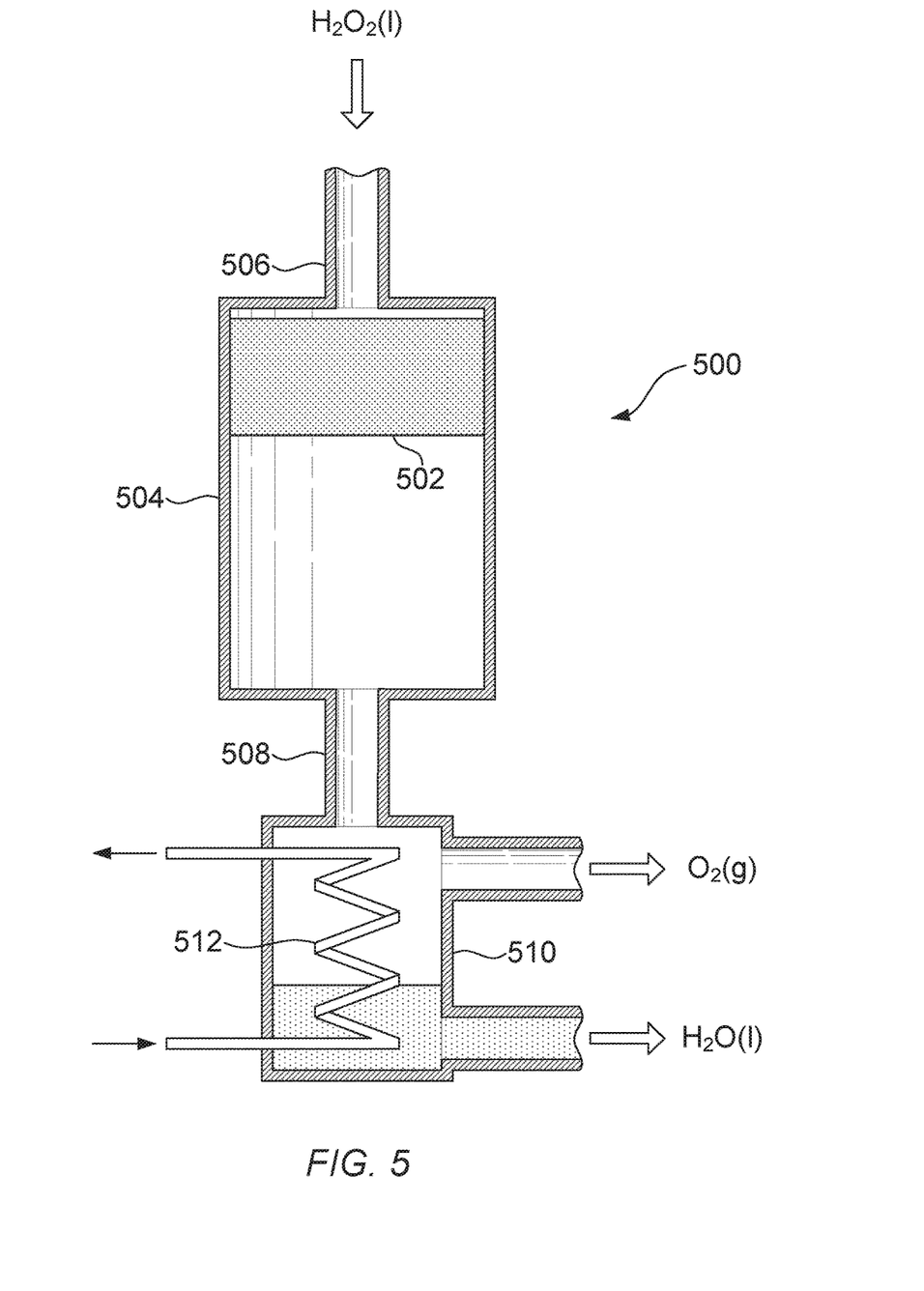
FIG. 5 illustrates a gas generator according to an embodiment of the present invention.

FIG. 5 illustrates a gas generator 500 according to an embodiment of the present invention. The gas generator 500 comprises the catalyst 502, decomposition chamber 504, and inlet 506, similar to the above-described embodiments. However, instead of a nozzle the gas generator further comprises an outlet 508 arranged to transmit oxygen and water vapour gases from the decomposition chamber to a separating unit 510.

The separating unit 510 is arranged to separate the water vapour from the oxygen, and includes an oxygen outlet and a water outlet. In general, the separating unit 510 can comprise any means for separating water vapour and oxygen. In the present embodiment the separating unit 510 includes a cooling element 512 arranged to be cooled to a sufficiently low temperature to condense the water vapour received from the decomposition chamber 504, without condensing oxygen. The cooling element 512 can, for example, be a coiled pipe through which liquid coolant can be passed, a peltier-type cooler, or any other suitable cooling element.

Although in the present embodiment the separating unit 510 is disposed away from the decomposition chamber 504, in other embodiments the separating unit 510 could be included in the decomposition chamber 504 itself.

Figure 6:
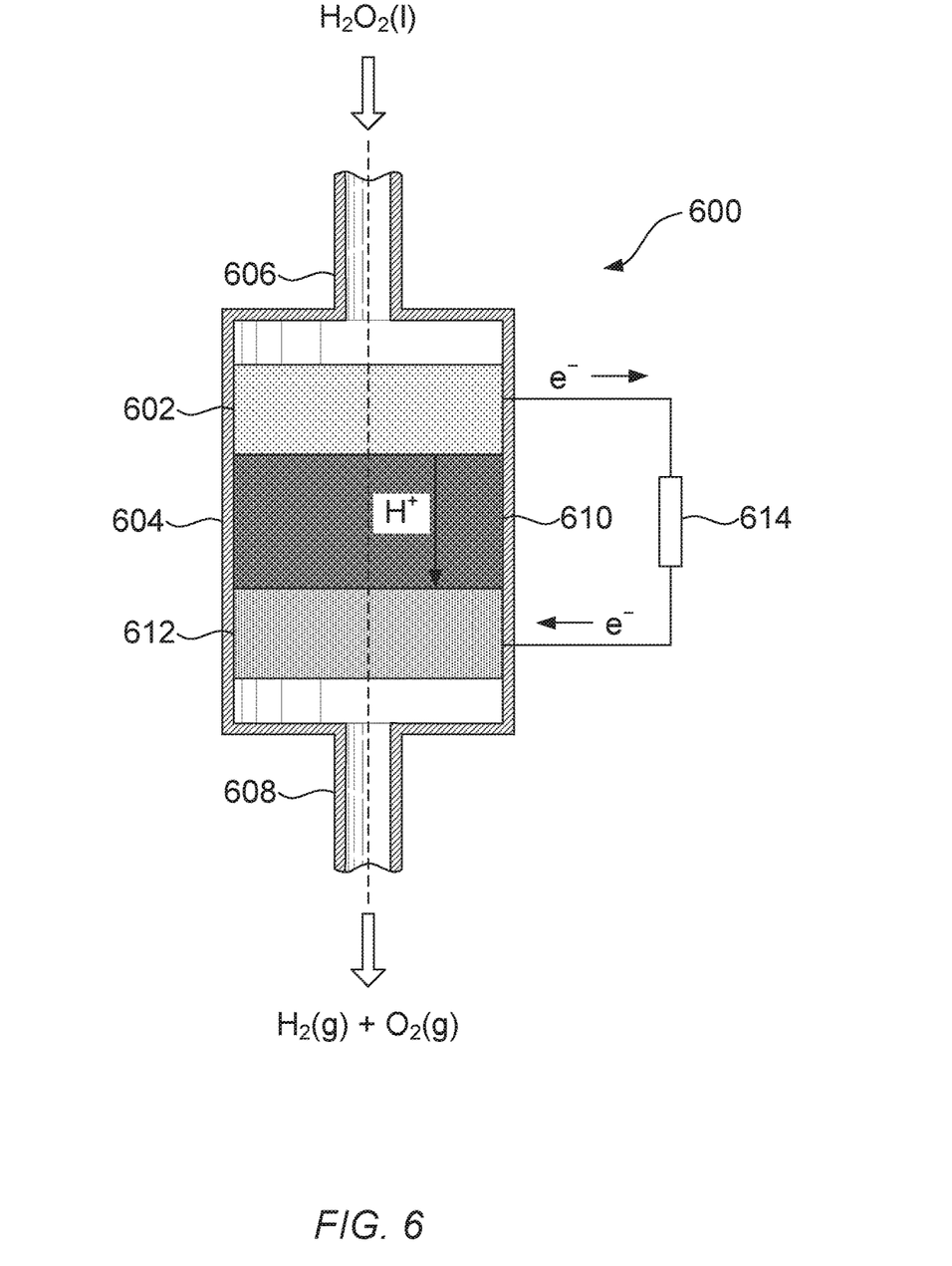
FIG. 6 illustrates a fuel cell according to an embodiment of the present invention.

FIG. 6 illustrates a fuel cell 600 according to an embodiment of the present invention. The fuel cell 600 comprises the catalyst 602 in a decomposition chamber 604 comprising a hydrogen peroxide inlet 606. The catalyst 602 forms an anode of the fuel cell 600, which further comprises a cathode 612 and a solid electrolyte 610 separating the anode 602 from the cathode 612.

The operating principles of fuel cells are well-known, and a detailed description will not be given here. However, in brief, the anode 602 and cathode 612 are arranged to be electrically connected via a load 614, so that electrons can flow from the anode 602 to the cathode 612 via the load 614. The load 614 can be any device which consumes electrical power. The anode 602, which comprises a catalyst such as the one shown in FIG. 1, generates hydrogen and oxygen from the hydrogen peroxide by catalytic decomposition. The anode 602 and cathode 612 are separated by the electrolyte 610, which is arranged to permit movement of hydrogen ions from the anode to the cathode. At the cathode 612, the hydrogen ions are reduced and hydrogen gas is generated.

Embodiments of the present invention have been described in which a catalyst comprising an active layer on a carrier comprising gamma-phase alumina is used to catalyse the decomposition of hydrogen peroxide. The catalytic decomposition of hydrogen peroxide can be used to generate exhaust gases which can be expelled from a nozzle in a specific direction to produce thrust. The exhaust gases can comprise water vapour and oxygen, as in a monopropellant thruster such as the one shown in FIG. 2, or can include reaction products produced by combusting a liquid or solid fuel with the oxygen produced by the hydrogen peroxide decomposition, as in the bipropellant thruster of FIG. 3 or the hybrid thruster of FIG. 4.

The apparatus of any of the above-described embodiments can be included in a spacecraft, such as a satellite or space vehicle. For example, any of the thrusters of FIGS. 2 to 4 can be used to generate thrust in a spacecraft, the gas generator of FIG. 5 can be used to provide oxygen and water for human consumption or other uses, and the fuel cell of FIG. 6 can be used to generate electrical power to power systems onboard the spacecraft or for terrestrial (ground-based) applications including air, naval and land operations.

Whilst certain embodiments of the invention have been described herein with reference to the drawings, it will be understood that many variations and modifications will be possible without departing from the scope of the invention as defined in the accompanying claims.

The invention claimed is:

1. Apparatus comprising:
    a decomposition chamber comprising an inlet arranged to receive high-concentration hydrogen peroxide; and
    a catalyst disposed in the decomposition chamber to catalyse decomposition of the high-concentration hydrogen peroxide received through the inlet, the catalyst comprising an active layer on a carrier comprising gamma-phase alumina;
    wherein the carrier further comprises aluminium and the gamma-phase alumina is disposed on the surface of the aluminium as a passivation layer.

2. The apparatus of claim 1, wherein the active layer comprises platinum.

3. The apparatus of claim 1, further comprising:
    a reservoir storing hydrogen peroxide with a concentration of 80% to 100%, the reservoir being arranged to provide the hydrogen peroxide to the inlet.

4. The apparatus of claim 1, wherein the catalyst is in pellet, granule or monolithic form.

5. The apparatus of claim 1, wherein the apparatus is a thruster and further comprises:
    a nozzle in fluid communication with the decomposition chamber, the nozzle being arranged to provide thrust by directing gas produced during decomposition of the hydrogen peroxide.

6. The apparatus of claim 5, wherein the apparatus is a bipropellant thruster, and the decomposition chamber further comprises a fuel inlet arranged to receive fuel from a fuel tank, the fuel inlet being disposed such that the fuel combusts with oxygen produced by the decomposition of the hydrogen peroxide.

7. The apparatus of claim 5, wherein the apparatus is a hybrid thruster and further comprises:
    a solid fuel arranged to combust with oxygen produced by the decomposition of the hydrogen peroxide.

8. The apparatus of claim 1, further comprising:
    a separating unit for separating water vapour and oxygen produced by the decomposition of the hydrogen peroxide.

9. The apparatus of claim 1, wherein the apparatus is a fuel cell and further comprises:
    an anode comprising the catalyst;
    a cathode arranged to be electrically connected to the anode via a load; and
    an electrolyte separating the anode from the cathode, the electrolyte being arranged to permit movement of hydrogen ions from the anode to the cathode.

* * * * *